US009428645B2

(12) United States Patent
Jung et al.

(10) Patent No.: US 9,428,645 B2
(45) Date of Patent: Aug. 30, 2016

(54) POLYALKYLENE CARBONATE AND POLYOLEFIN-BASED ADHESIVE MEMBER AND ADHESIVE STRUCTURE INCLUDING THE SAME

(71) Applicants: NARA Chem Co., Ltd., Seongnam-si, Gyeonggi-do (KR); Dong Kweon Lee, Anyang-si, Gyeonggi-do (KR)

(72) Inventors: Keun Bong Jung, Cheonan-si (KR); Dong Kweon Lee, Anyang-si (KR); Sang Moon Lee, Seoul (KR); Dong Jin Lee, Daejeon (KR)

(73) Assignees: HUINNOVATION CO., LTD., Seongnam-Si (KR); Dong Kweon Lee, Anyang-Si (KR)

( * ) Notice: Subject to any disclaimer, the term of this patent is extended or adjusted under 35 U.S.C. 154(b) by 64 days.

(21) Appl. No.: 14/377,231

(22) PCT Filed: Mar. 13, 2013

(86) PCT No.: PCT/KR2013/002019
§ 371 (c)(1),
(2) Date: Aug. 7, 2014

(87) PCT Pub. No.: WO2013/157740
PCT Pub. Date: Oct. 24, 2013

(65) Prior Publication Data
US 2014/0370280 A1    Dec. 18, 2014

(30) Foreign Application Priority Data
Apr. 19, 2012   (KR) .................. 10-2012-0041178

(51) Int. Cl.
*C09J 169/00*   (2006.01)
*C08L 69/00*   (2006.01)
(Continued)

(52) U.S. Cl.
CPC .................. *C08L 69/00* (2013.01); *B32B 7/12* (2013.01); *B32B 27/08* (2013.01); *B32B 27/306* (2013.01);
(Continued)

(58) Field of Classification Search
None
See application file for complete search history.

(56) References Cited

U.S. PATENT DOCUMENTS 4,784,885 A * 11/1988 Carespodi ................. B32B 7/06
229/123.2
4,833,036 A *  5/1989 Cannarsa ............... C08G 64/34
156/327

(Continued)

FOREIGN PATENT DOCUMENTS

KR         95-008901 B1     8/1995
KR         10-0266853 B1    9/2000
(Continued)

OTHER PUBLICATIONS

Product data sheet "Acrylic Acid" from Sigma-Aldrich, retrived on Dec. 4, 2015.*

Primary Examiner — Hai Vo
Assistant Examiner — Anish Desai
(74) Attorney, Agent, or Firm — Birch, Stewart, Kolasch & Birch, LLP

(57) ABSTRACT

Disclosed are a polyalkylene carbonate and polyolefin-based adhesive member and an adhesive structure including the same and, more particularly, an adhesive member manufactured using a mixed composition including polyalkylene carbonate, polyolefin, an initiator, and a blending aid, wherein an amount of the polyalkylene carbonate is 35 wt % to 65 wt %, a total amount of the initiator, the blending aid, and the polyolefin is 35 wt % to 65 wt %, and the adhesive member has a co-continuous morphology in which at least a portion of each of the polyalkylene carbonate and the polyolefin is exposed on an outer surface of the adhesive member and an adhesive structure including the same.

13 Claims, 2 Drawing Sheets

(51) Int. Cl.
*C08L 23/02* (2006.01)
*B32B 7/12* (2006.01)
*B32B 27/08* (2006.01)
*B32B 27/30* (2006.01)
*B32B 27/32* (2006.01)
*B32B 27/34* (2006.01)

(52) U.S. Cl.
CPC ............... *B32B 27/32* (2013.01); *B32B 27/34* (2013.01); *C08L 23/02* (2013.01); *C09J 169/00* (2013.01); *B32B 2270/00* (2013.01); *B32B 2323/00* (2013.01); *B32B 2369/00* (2013.01); *B32B 2605/08* (2013.01); *Y10T 428/2848* (2015.01); *Y10T 428/2878* (2015.01); *Y10T 428/31507* (2015.04)

(56) References Cited

U.S. PATENT DOCUMENTS

| | | | | |
|---|---|---|---|---|
| 4,912,149 | A | * | 3/1990 | Robeson ................. C08L 31/04 524/501 |
| 5,536,806 | A | * | 7/1996 | Sant'Angelo ........... B32B 27/08 264/176.1 |
| 6,544,661 | B1 | | 4/2003 | Lee |
| 2011/0309539 | A1 | | 12/2011 | Steinke et al. |

FOREIGN PATENT DOCUMENTS

| | | |
|---|---|---|
| KR | 10-1073888 B1 | 10/2011 |
| KR | 10-2011-0127727 A | 11/2011 |

\* cited by examiner

POLYALKYLENE CARBONATE AND POLYOLEFIN-BASED ADHESIVE MEMBER AND ADHESIVE STRUCTURE INCLUDING THE SAME

TECHNICAL FIELD

The present invention relates to a polyalkylene carbonate and polyolefin-based adhesive member for significantly enhancing adhesion between polyalkylene carbonate and polyolefin and an adhesive structure including the same and, more particularly, to an adhesive member that is manufactured using a mixed composition including polyalkylene carbonate, polyolefin, an initiator, and a blending aid, wherein the amount of the polyalkylene carbonate is 35 to 65 wt %, a total amount of the initiator, the blending aid, and the polyolefin is 35 to 65 wt %, and the adhesive member has a co-continuous morphology in which at least a portion of each of the polyalkylene carbonate and the polyolefin is exposed on an outer surface of the adhesive member and an adhesive structure including the same.

BACKGROUND ART

Plastic resins are one of the most convenient materials and have been used widely in daily life since the 20$^{th}$ century. In addition, as mass production of plastic resins is realized due to development of the petrochemical industry, demand therefor is rapidly increasing and use of plastic resins is expanded from applications for daily life to applications for industry.

General-purpose resins were initially used mainly in daily necessities such as household goods, engineering plastics are mainly used ire applications for industry or manufacturing industry and, furthermore, super engineering plastics are used in specific fields, beyond satisfying required properties of materials for general industries and its market is continuously expanding.

As the automobile industry is focusing on more lightweight automobiles, demand for plastics is increasing in more various fields, and demand for polymer materials needed due to development of new technologies such as IT, semiconductors, electric vehicles, and the like is already growing in a variety of fields and is expected to be increasing more broadly in near future.

Recently, to address environmental problems due to generally used existing plastics, use of polyalkylene carbonates, which are aliphatic alkylene carbonates based on carbon dioxide generated as a byproduct gas, has drawn much attention.

Among these aliphatic alkylene carbonates, polypropylene carbonate (PPC) is prepared by polymerizing propylene oxide and carbon dioxide using a special catalyst. Currently, in the U.S., Novomer and Eastman Kodak are co-developing PPC as a packaging material with excellent oxygen-blocking properties, Japan's Sumitomo Chemical Co., Ltd is trying to enhance physical properties of PPC through complexation with other plastics, and, in particular, Tianquan and the like in China are commercially producing PPC thanks to active support from the Chinese government. However, productivity of PPC is limited due to deficiency in manufacturing technology, in particular catalyst technology. In South Korea, SK Innovation Co. Ltd has succeeded in production of carbon dioxide-based polymers by developing a catalyst technology capable of minimizing the amount of a cyclic carbonate and generating high molecular weight and, currently, a total of 16 institutions including enterprises, laboratories, universities, and the like are participating in "business for practical applications of green technology using byproduct gases" organized by Ulsan Technopark and are progressing development of eco-friendly products using carbon dioxide-based polymers and commercialization thereof.

Such polyalkylene carbonate (PAC) materials are advantageous in that PACs, such as polar polymers, e.g., ethylene vinyl alcohol (EVOH), nylon, and the like, have excellent barrier properties against gases and organic solvents and thus may be used as a packaging material for meat processed foods, industrial products, and the like. However, PACs having a glass transition temperature Tg of about 38 to 40° C. are easily brittle at Tg or less and are not suitable for use in independent molded products due to soft and sticky properties thereof at Tg or higher. Therefore, there is a need to develop technology for manufacturing a multilayer molded product using a PAC in combination with polyolefin, which is a general-purpose plastic, to complement these physical properties.

In general, when multilayer molded products are manufactured using a polar polymer such as EVOH, nylon, or the like and polyolefin, a polymer, which is prepared by copolymerizing a material selected from the group consisting of carboxylic acid, anhydrides, ester monomers, and the like onto a main chain or side chain of polyolefin or the like, is used to form an adhesive layer. A method of forming such an adhesive layer is disclosed in U.S. Pat. Nos. 4,206,967 and 3,953,655, and the manufactured multilayer molded products have high adhesive strength.

However, unlike existing base materials mixed with polyolefins, such as EVOH, nylon, and the like, to manufacture a multilayer molded product using polyalkylene carbonate and polyolefin. When the polymer prepared by copolymerizing or grafting a material selected from the group consisting of carboxylic acid, anhydrides, ester monomers, and the like onto a main chain or side chain of polyolefin or the like is used to form an adhesive layer, adhesion between the polymer and the polyalkylene carbonate is too low.

Therefore, there is an urgent need to develop a polyalkylene carbonate-based adhesive member with significantly enhanced adhesion to polyalkylene carbonate.

DISCLOSURE

Technical Problem

The present invention aims to address the aforementioned problems of the related art and to achieve technical goals that have long been sought.

As a result of a variety of extensive and intensive studies and experiments, the inventors of the present invention confirmed that, as described below, when an adhesive member is manufactured using a novel mixed composition including particular amounts of polyalkylene carbonate, polyolefin, and other particular components, miscibility between the polyalkylene carbonate and the polyolefin is enhanced and thus a specific morphology may be stably formed and, accordingly, adhesion between the two resins is possible, whereby an adhesive structure that complements disadvantages of the two resins and exhibits excellent physical properties may be manufactured, thus completing the present invention.

Technical Solution

In accordance with one aspect of the present invention, provided is an adhesive member prepared using a mixed composition including polyalkylene carbonate, polyolefin, an initiator, and a blend wherein the amount of the polyalkylene carbonate is 35 to 65 wt %, a total amount of the initiator, the blending aid, and the polyolefin is 35 to 65 wt %, and the adhesive member has a co-continuous morphology in which at least a portion of each of the polyalkylene carbonate and the polyolefin is exposed on an outer surface of the adhesive member.

The polyalkylene carbonate has flame retardancy and non-toxicity when burned and has excellent gas and organic solvent-blocking properties, high printability, high transparency, and the like. On the other hand, as described above, polyalkylene carbonates having a glass transition temperature Tg of 38 to 40° C. are very brittle at Tg or less and are not suitable for use as a general-purpose material due to high adhesiveness at Tg or higher and thus require use in combination with a resin that may complement this problem. Thus, polyolefin, which is one of the most widely used general-purpose resins, has excellent processability, and is cheaper than other resins, may be used as a complementary resin.

In one specific embodiment, the polyalkylene carbonate may have a number average molecular weight of 20,000 to 500,000 and various kinds of materials having the number average molecular weight within the above-described range may be used. In particular, the poly alkylene carbonate may be polyethylene carbonate (PEC) and/or polypropylene carbonate (PPC).

PEC is synthesized through the following reaction scheme and, in particular, has a number average molecular weight of 25,000 to 500,000.

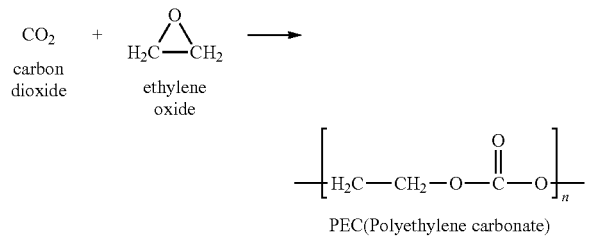

PPC is synthesized through the following reaction scheme and, particular, has a number average molecular weight of 30,000 to 600,000.

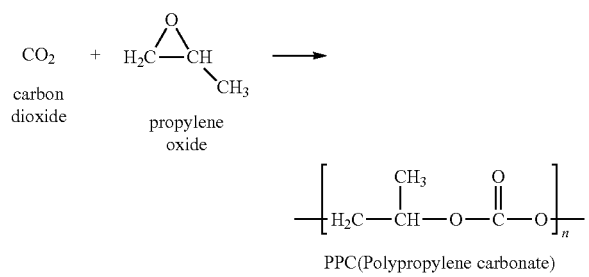

A method of preparing such polyalkylene carbonate is known in the art and thus a detailed description thereof will be omitted herein.

The polyolefin may, for example, be at least one polymer or copolymer selected from the group consisting of polyethylene (PE), polypropylene (PP), polybutene, ethylene-propylene rubber (EPR), ethylene-propylene diene rubber (EPDM), poly-4-methyl-1-pentene (TPX), copolymers of ethylene with propylene, butene, hexene and/or octane, and olefin-based thermoplastic elastomers.

The inventors of the present invention confirmed that a specific morphology in which at least a portion of the polyalkylene carbonate and the polyolefin is exposed on an outer surface of the adhesive member may be formed and maintained by adjusting a composition of the polyalkylene carbonate, the polyolefin, and other particular components and also further applying processing conditions as desired and, accordingly, miscibility and adhesive strength may be enhanced.

The co-continuous morphology has a structure in which the polyalkylene carbonate and the polyolefin have a continuous phase and are entirely and randomly dispersed, and the two resins are exposed on the outer surface of the adhesive member contacting a material to be adhered.

The amounts of the portions of the respective resins exposed on the outer surface of the adhesive member are not limited. However, to enable easy adhesion to the two resins and to have a predetermined adhesive strength, in particular, a ratio of the respective exposed portions of the polyalkylene carbonate and the polyolefin may be 2:8 to 8:2, more particularly 3:7 to 7:3, based on the entire area of the outer surface.

When the ratio is outside the above-described range and thus only one of the two resins constitutes most the outer surface, adhesion to the other resin may be reduced.

As such, the adhesive member that stably forms the above-described morphology exhibits excellent adhesion to the two resins. In one specific embodiment, a minimum adhesive strength for polyalkylene carbonate and polyolefin of the adhesive member may be 0.8 kg/cm or more, more particularly 1.5 kg/cm or more.

Meanwhile, as described above, although a polyalkylene carbonate and polyolefin combination is very attractive because it complements their disadvantages, use thereof as an existing material for formation of an adhesive layer is almost impossible due to their different intrinsic properties. In addition, when an adhesive member is manufactured by mixing polyalkylene carbonate and polyolefin in similar amounts, miscibility is very low and thus the mixed composition has an interface between the two resins and a structure that dramatically varies according to small changes in amount of each component and, accordingly, a stable morphology may not be formed and, consequently, the adhesive member is unable to properly exhibit desired functions.

Therefore, in the present invention, to use polyalkylene carbonate in combination with polyolefin that may maintain advantages of the polyalkylene carbonate and complement disadvantages thereof, an initiator and a blending aid as particular components capable of enhancing miscibility between the two resins are mixed with the mixed composition for manufacture of the adhesive member and thus the above-described problems may be addressed.

The blending aid may be any one selected from a first blending aid having a lower molecular weight of 20 to 1,000 and a mixture of the first blending aid and a second blending aid having a higher molecular weight of 30,000 to 300,000.

In particular, the miscibility problems may be addressed using combination including a first blending aid that binds to some molecular chains of the polyolefin and the polyalkylene carbonate through reaction to modify miscibility between the two resins and an initiator that induces such reaction; or the combination further including a second blending aid having, within a single molecular unit, a polar segment having compatibility with the polyalkylene carbonate and a non-polar segment having compatibility with the polyolefin.

In addition, when the mixed composition includes at least the combination of the first blending aid and the initiator, desired miscibility may be obtained and thus a stable morphology may be formed. However, when the mixed composition includes only the second blending aid, it may be impossible to obtain desired miscibility and thus it is difficult to stably form the morphology. This may be confirmed from the results of Experimental Example 1, which will be described below.

Moreover, the initiator for induction of reaction of the first blending aid has to be used. When the initiator is omitted from the mixed composition, the reaction of the first blending aid does not independently occur and is induced through binding to a base material and thus only similar miscibility to that in a case in which the second blending aid is used alone is exhibited and thus desired effects may not be obtained.

The initiator may, for example, be one or a mixture of at least two selected from the group consisting of a hydroperoxide-based initiator, a ketone peroxide-based initiator, an acyl peroxide-based initiator, a dialkyl- or dialkyl peroxide-based initiator, a peroxy ester-based initiator, and an azo compound-based initiator. In particular, the initiator may be one or a mixture of at least two selected from the group consisting of tert-butyl hydroperoxide, p-methane hydroperoxide, cumene hydroxide, cyclohexanone peroxide, methylethyl ketone peroxide, benzoyl peroxide, di-tert-butyl peroxide, dicumyl peroxide, cumylbutyl peroxide, 1,1-di-tert-butylperoxy-3,5,5-trimethylcyclohexane, 2,5-dimethyl-2,5-2,5-di-tert-butylperoxy isopropylbenzene, tert-butyl peroxypivalate, tert-butyl di(perphthalate)dialkyl peroxymonocarbonate, and peroxydicarbonate azobis isobutyronitrile.

The first blending aid may be one or a mixture of at least two selected from the group consisting of vinyltrimethoxy silane, vinyl-tris(beta-methoxyethoxy)silane, vinyltriacetoxy silane, vinyltrismethoxyethoxy silane, gamma-(meth)acryloxypropyltriethoxy silane, vinyltriethoxy silane, and gamma-(meth)acryloxypropyltrimethoxy silane; and acrylic acid, fumaric acid, methacrylic acid, crotonic acid, maleic acid, itaconic acid, sorbic acid, and anhydrides thereof.

The second blending aid may be one or a mixture of at least two selected from ethylene acrylate copolymers such as ethylene-acrylic acid (EAA) copolymer, ethylene-methacrylic acid (EMA) copolymer, ethylene-ethylacrylate (EEA) copolymer, ethylene-alkylacrylate-acrylic acid copolymer, ethylene-alkylmethacrylate-methacrylic acid copolymer, ethylene-butylacrylate (EBA) copolymer, and ethylene-vinylacetate (EVA) copolymer, or a modified material thereof. More particularly, the second blending aid may be EEA copolymer modified with maleic anhydride.

The initiator is used in a catalytic amount and thus the amount of the initiator may be 2 parts by weight or less, particularly 1 part by weight or less, based on 100 parts by weight of the polyolefin.

The first and second blending aids are added in effective amounts thereof. In particular, the amount of the first blending aid in the mixed composition may be 0.5 to 40 parts by weight, particularly 1 to 20 parts by weight, more particularly 1 to 10 parts by weight, based on 100 parts by weight of the polyolefin. When the first and second blending aids are used in combination, the amount of the second blending aid in the mixed composition may be 1 to 900 parts by weight, particularly 2 to 500 parts by weight, more particularly 2 to 100 parts by weight, based on 100 parts by weight of the polyolefin. That is, when the second blending aid is added together with the first blending aid, the second blending aid may be added in the amount within the above-described range, while the second blending aid may be added in an excessive amount with respect to the polyolefin. Thus, as the amount of the second blending aid increases, the amount of the polyolefin relatively decreases and thus configuration in which the polyolefin is added in a very small amount also should be interpreted to be within the scope of the present invention.

In one specific embodiment, the mixed composition may further include a polymer having miscibility with the polyalkylene carbonate. When the polymer having miscibility with the polyalkylene carbonate is added, miscibility between the two resins is enhanced.

The polymer having miscibility with the polyalkylene carbonate may, for example, be one or a mixture of at least two selected from the group consisting of cellulose acetate propionate (CAP), cellulose acetate butyrate (CAB), polyamide (PA), polylatic acid (PLA), polybutylene succinate (PBS), polyvinyl acetate (PVAc), polymethyl methacrylate (PMMA), ethylene vinyl alcohol (EVOH), polyvinyl alcohol (PVA), polycarbonate (PC), and ionomer-based polymers.

In one specific embodiment, the amount of the polymer may be 1 to 30 wt %, particularly 5 to 20 wt %, based on a total weight of the mixed composition.

In addition, as desired, the mixed composition may further include an additive such as a plasticizer, an anti-foaming agent, an anti-oxidant, a flame retardant, a foaming agent, or the like.

A shape of the adhesive member according to the present invention is not limited, and the adhesive member may be obtained by, for example, forming the mixed composition in the form of a film.

The present invention also provides an adhesive structure in which the adhesive member is disposed on a surface or opposite surfaces of a polyolefin member, on a surface or opposite surfaces of a polyalkylene carbonate member, or between the polyolefin member and the polyalkylene carbonate member.

The adhesive structure is not particularly limited so long as the adhesive structure includes at least one of polyalkylene carbonate and polyolefin in addition to the adhesive member. However, in particular, the adhesive structure may be a laminate sheet in which a polyolefin member, the adhesive member, and a polyalkylene carbonate member are sequentially stacked.

The laminate sheet may be formed by co-extrusion or may be fabricated using various other methods, such as by melting a polymer resin between films respectively formed of polyolefin and polyalkylene carbonate to adhere the two films to each other, and the like.

In the present invention, the laminate sheet is given as an example of the adhesive member, but various other kinds of applications are possible and should be interpreted as within the scope of the present invention.

BRIEF DESCRIPTION OF THE DRAWINGS

The above and other objects, features and other advantages of the present invention will be more clearly understood from the following detailed description taken in conjunction with the accompanying drawing, in which.

BEST MODE

Figure 1:
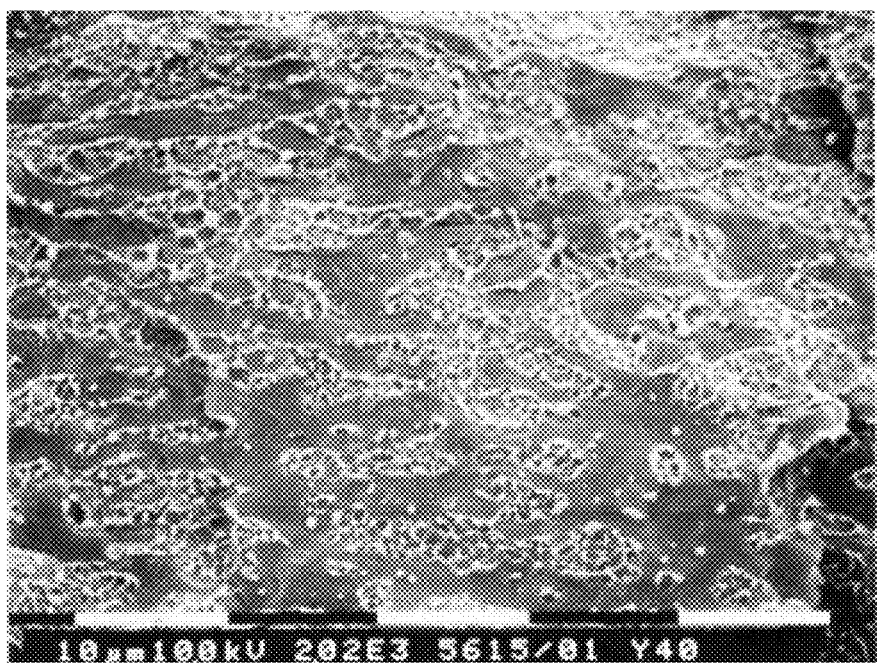
FIG. 1 is a scanning electron microscope (SEM) image of a polymer resin obtained according to Example 1 through reaction of a mixture of polyalkylene carbonate and polyolefin.

Now, the present invention will be described in more detail with reference to the following examples. These examples are provided for illustrative purposes only and should not be construed as limiting the scope and spirit of the present invention.

Example 1

100 parts by weight of polyethylene (PE), 0.1 parts by weight of dicumyl peroxide as an initiator, and 1 part by weight of maleic anhydride having a molecular weight of 98 as a first blending aid were mixed using a super mixer, and 50 wt % of polypropylene carbonate was added to 50 wt % of the resultant mixture, followed by dry blending. The dry-blended mixture was melt blended in a twin-screw extruder under the following conditions: temperature gradient of 70° C.-150° C.-170° C.-190° C.-200° C.-200° C. and 40 rpm and extruded to fabricate a pellet. Thereafter, the pellet, polypropylene carbonate, and PE were co-extruded to manufacture a laminate sheet.

Example 2

A laminate sheet was manufactured in the same manner as in Example 1, except that maleic anhydride as a first blending aid and 5 parts by weight of ethylene-ethylacrylate copolymer modified with maleic anhydride, having a molecular weight of 120,000, as a second blending aid were used in combination.

Example 3

100 parts by weight of PE, 0.1 parts by weight of dicumyl peroxide as an initiator, 1 part by weight of maleic anhydride as a first blending aid, and 10 parts by weight of a zinc ionomer, which is a miscible polymer, were mixed using a super mixer, and 50 wt % of polypropylene carbonate was added to 50 wt % of the resultant mixture, followed by dry blending. The dry-blended mixture was melt blended in a twin-screw extruder under the following conditions: temperature gradient of 70° C.-150° C.-170° C.-190° C.-200° C.-200° C. and 40 rpm and extruded to fabricate a pellet. Thereafter, the pellet, polypropylene carbonate, and PE were co-extruded to manufacture a laminate sheet.

Example 4

100 parts by weight of PE, 0.1 parts by weight of dicumyl peroxide as an initiator, 1 part by weight of maleic anhydride as a first blending aid, 5 parts by weight of ethylene-ethylacrylate copolymer modified with maleic anhydride, having a molecular weight of 120.000, as a second blending aid, and 10 parts by weight of a zinc ionomer were mixed using a super mixer, and 55 wt % of polypropylene carbonate was added to 45 wt % of the resultant mixture, followed by dry blending. The dry-blended mixture was melt blended in a twin-screw extruder under the following conditions: temperature gradient of 70° C.-150° C.-170° C.-190° C.-200° C.-200° C. and 40 rpm and extruded to fabricate a pellet. Thereafter, the pellet, polypropylene carbonate, and PE were co-extruded to manufacture a laminate sheet.

Comparative Example 1

A laminate sheet was manufactured in the same manner as in Example 1, except that only 50 wt % of polypropylene carbonate was added to 50 wt % of PE and blended by mixing.

Comparative Example 2

A laminate sheet was manufactured in the same manner as in Example 1, except that 10 wt % of ethylene-ethylacrylate copolymer modified with maleic anhydride as a second blending aid, 40 wt % of PE, and 50 wt % of polypropylene carbonate were blended by mixing.

Comparative Example 3

A laminate sheet was manufactured in the same manner as in Example 1, except that 10 wt % of ethylene-ethylacrylate modified with maleic anhydride, 35 wt % of PE, and 55 wt % of polypropylene carbonate were blended by mixing.

Example 5

100 parts by weight of PE, 0.1 parts by weight of dicumyl peroxide as an initiator, 1 part by weight of maleic anhydride as a first blending aid, and 10 parts by weight of a zinc ionomer, which is a miscible polymer, were mixed using a super mixer, and 50 wt % of polypropylene carbonate was added to 50 wt % of the resultant mixture, followed by dry blending. The dry-blended mixture was melt blended in a twin-screw extruder under the following conditions: temperature gradient of 70° C.-150° C.-170° C.-190° C.-200° C.-200° C. and 40 rpm and extruded to fabricate a pellet. Thereafter, the pellet was subjected to single-layer extrusion to manufacture a laminate sheet having a thickness of 0.7 mm as an adhesive layer, and the PE laminate sheet having a thickness of 0.7 mm and a polypropylene carbonate sheet were subjected to compression molding, thereby completing manufacture of a multilayer laminate sheet.

Example 6

100 parts by weight of PE, 0.1 parts by weight of dicumyl peroxide as an initiator, 1 part by weight of maleic anhydride as a first blending aid, 5 parts by weight of ethylene-ethylacrylate copolymer modified with maleic anhydride, having a molecular weight of 120,000, as a second blending aid, and 10 parts by weight of a zinc ionomer were mixed using a super mixer, and 55 wt % of polypropylene carbonate was added to 45 wt % of the resultant mixture, followed by dry blending. The dry-blended mixture was melt blended in a twin-screw extruder under the following conditions: temperature gradient of 70° C.-150° C.-170° C.-190° C.-200° C.-200° C. and 40 rpm and extruded to fabricate a pellet. Thereafter, the pellet was subjected to single-layer extrusion to manufacture a laminate sheet having a thickness of 0.7 mm as an adhesive layer, and the PE laminate sheet having a thickness of 0.7 mm and a polypropylene carbonate sheet were subjected to compression molding, thereby completing manufacture of a multilayer laminate sheet.

Comparative Example 4

A multilayer laminate sheet was manufactured in the same manner as in Example 5, except that 10 wt % of ethylene-ethylacrylate copolymer modified with maleic anhydride as a second blending aid, 40 wt % of PE, and 50 wt % of polypropylene carbonate were blended by mixing.

Comparative Example 5

A multilayer laminate sheet was manufactured in the same manner as in Example 5, except that 10 wt % of ethylene-ethylacrylate copolymer modified with maleic anhydride as a second blending aid, 35 wt % of PE, and 55 wt % of polypropylene carbonate were blended to manufacture a laminate sheet as an adhesive layer.

Experimental Example 1

Figure 2:
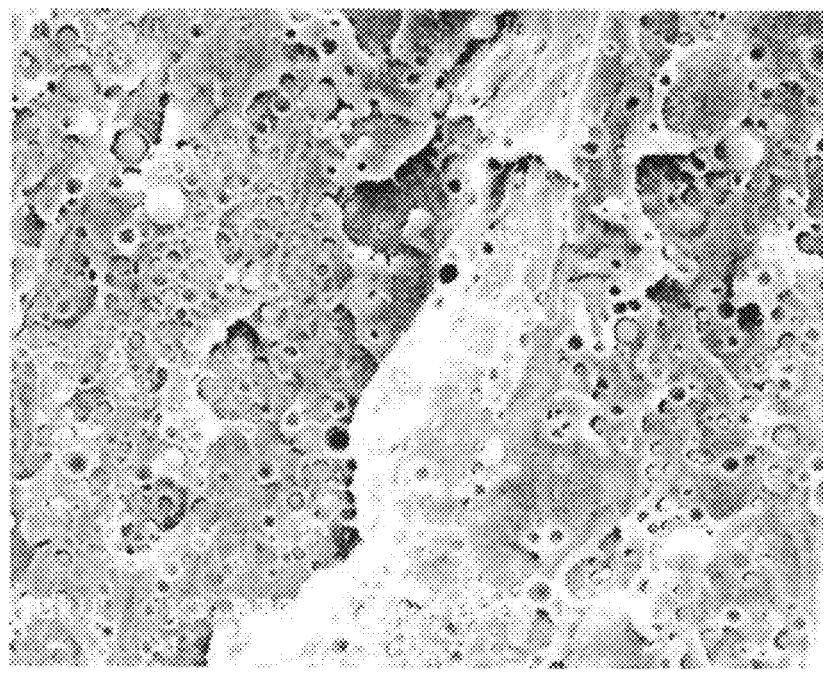
FIG. 2 is an SEM image of a polymer resin obtained according to Comparative Example 2 through reaction of a mixture of polyalkylene carbonate and polyolefin.

Each of the mixtures prepared according to Example 1 and Comparative Example 2 was subjected to reaction to prepare a polymer resin, and morphology of the polymer resin was observed using a scanning electron microscope (SEM). Images taken by the SEM are illustrated in FIGS. 1 and 2. Referring to FIGS. 1 and 2, the polymer resin of Example 1 has a structure in which the polyalkylene carbonate and the polyolefin have a continuous phase and are randomly present and thus are unable to be distinctly distinguished from each other, while the polymer resin of Comparative Example 2 has a continuous and discontinuous (matrix and dispersed phase) morphology.

Meanwhile, the polymer resin of Comparative Example 1 is unable to serve as an adhesive layer because the polyolefin and the polyalkylene carbonate are not mixed well and an interface is formed therebetween. The polymer resins of Comparative Examples 2 and 3 do not have a co-continuous morphology in spite of including the second blending aid and have a continuous and discontinuous (matrix and dispersed phase) morphology and thus have adhesion only to one of the polyolefin and the polyalkylene carbonate, which makes it difficult to serve as an adhesive layer.

In addition, an intermediate composition region (47.5 wt % of polyolefin and second blending aid and 52.5 wt % of polypropylene carbonate) of each of the polymer resins of Comparative Examples 2 and 3 may instantaneously have a co-continuous morphology in a melt state, but the intermediate composition region tends to rapidly return to the continuous and discontinuous morphology and, accordingly, composition with a co-continuous morphology is very small or nearly none.

Experimental Example 2

Adhesion to PE and polypropylene carbonate of each of the laminate sheets manufactured according to Examples 1 to 4 and Comparative Examples 1 to 3 was measured and results are shown in Table 1 below. The adhesion was measured using each co-extruded laminate sheet after cutting into a size of 30 mm×100 mm. The adhesion was relatively evaluated based on cases in which PE and polypropylene carbonate are easily separated and not separated.

In addition, adhesive strengths of the multilayer laminate sheets manufactured according to Examples 5 and 6 and Comparative Examples 4 and 5 were measured using a universal testing machine (UTM). Results are shown in Table 2 below.

TABLE 1

|  | PE adhesion | PPC adhesion |
| --- | --- | --- |
| Comparative Example 1 | Δ | X |
| Comparative Example 2 | ⊙ | X |
| Comparative Example 3 | X | ⊙ |
| Example 1 | ○ | ○ |
| Example 2 | ⊙ | ○ |
| Example 3 | ○ | ⊙ |
| Example 4 | ⊙ | ⊙ |

X: no adhesion (easily separated)
Δ: medium adhesion
○: high adhesion
⊙: excellent adhesion (not separated)

TABLE 2

|  | Adhesion between PE and adhesive layer (kg/cm) | Adhesion between PPC and adhesive layer (kg/cm) |
| --- | --- | --- |
| Comparative Example 4 | 5.2 | <0.2 |
| Comparative Example 5 | <0.2 | 4.3 |
| Example 5 | 2.2 | 2.3 |
| Example 6 | 2.4 | 3.5 |

As shown in Tables 1 and 2 above, it can be confirmed that the laminate sheets of Examples 1 to 6 exhibit a certain level or higher of adhesion to PE and polyalkylene carbonate as compared to the laminate sheets of Comparative Examples 1 to 5. In particular, it can be confirmed that the laminate sheets of Examples 4 and 6 exhibit excellent adhesion to both PE and polyalkylene carbonate.

The laminate sheets of Comparative Examples 2 and 4 exhibit excellent adhesion to PE, while exhibiting little adhesion to polyalkylene carbonate, which is difficult to measure. The laminate sheets of Comparative Examples 3 and 5 exhibit excellent adhesion to polyalkylene carbonate, while exhibiting little adhesion to PE, which is difficult to measure. This indicates that, when the second blending aid is used alone, the mixed composition has a continuous and discontinuous (matrix and dispersed phase) morphology and thus exhibits adhesion only to polyolefin or polyalkylene carbonate, which makes it difficult to serve as an adhesive layer.

Miscibility is generally proportional to adhesion. The polymer resin of Example 1 exhibits sufficient miscibility to adhere polyolefin to polyalkylene carbonate.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, an adhesive member according to the present invention includes particular amounts of polyalkylene carbonate, polyolefin, and other particular components and thus exhibits excellent miscibility, which enables stable formation of a specific morphology. Accordingly, the adhesive member has adhesion to the polyalkylene carbonate and the polyolefin that is increased to a certain level or higher and thus an adhesive structure that complements disadvantages of the two resins and exhibits excellent physical properties may be manufactured.

The invention claimed is:

1. An adhesive member manufactured using a mixed composition comprising polyalkylene carbonate, polyolefin, an initiator, and a blending aid, wherein an amount of the polyalkylene carbonate is 35 wt % to 65 wt %, and a total amount of the initiator, the blending aid, and the polyolefin is 35 wt % to 65 wt %; and the adhesive member has a co-continuous morphology in which at least a portion of each of the polyalkylene carbonate and the polyolefin is exposed on an outer surface of the adhesive member, wherein the polyalkylene carbonate and the polyolefin exist as a continuous phase, and the polyalkylene carbonate and the polyolefin being miscible in the mixed composition wherein the blending aid is any one selected from the group consisting of a first blending aid having a lower molecular weight of 20 to 1,000; and a mixture of the first blending aid and a second blending aid having a higher molecular weight of 30,000 to 300,000.

2. The adhesive member according to claim 1, wherein the polyalkylene carbonate has a molecular weight of 20,000 to 500,000.

3. The adhesive member according to claim 1, wherein an adhesive strength for polyalkylene carbonate and polyolefin of the adhesive member is 0.8 kg/m or more.

4. The adhesive member according to claim 1, wherein an adhesive strength for polyalkylene carbonate and polyolefin of the adhesive member is 1.5 kg/cm or more.

5. The adhesive member according to claim 1, wherein the polyalkylene carbonate is polyethylene carbonate (PEC) and/or polypropylene carbonate (PPC).

6. The adhesive member according to claim 1, wherein the first blending aid is one or a mixture of at least two selected from the group consisting of vinyltrimethoxy silane, vinyltris(beta-methoxyethoxy)silane, vinyltriacetoxy silane, vinyltrismethoxyethoxy silane, gamma-(meth)acryloxypropyltriethoxy silane, vinyltriethoxy silane, and gamma-(meth)acryloxypropyltrimethoxy silane; and acrylic acid, fumaric acid, methacrylic acid, crotonic acid, maleic acid, itaconic acid, sorbic acid, and anhydrides thereof.

7. The adhesive member according to claim 1, wherein the second blending aid is ethylene-ethylacrylate copolymer modified with maleic anhydride.

8. The adhesive member according to claim 1, wherein the mixed composition further comprises a polymer having miscibility with the polyalkylene carbonate to enhance miscibility among the polyalkylene carbonate, the polyolefin, the initiator, and the blending aid of the mixed composition.

9. The adhesive member according to claim 8, wherein an amount of the polymer is 1 wt % to 30 wt % based on a total weight of the mixed composition.

10. The adhesive member according to claim 8, wherein the polymer is one or a mixture of at least two selected from the group consisting of cellulose acetate propionate (CAP), cellulose acetate butyrate (CAB), polyamide (PA), polylactic acid (PLA), polybutylene succinate (PBS), polyvinyl acetate (PVAc), polymethyl methacrylate (PMMA), ethylene vinyl alcohol (EVOH), polyvinyl alcohol (PVA), polycarbonate (PC), and ionomer-based polymers.

11. The adhesive member according to claim 1, wherein the adhesive member is obtained by forming the mixed composition in the form of a film.

12. An adhesive structure in which the adhesive member according to claim 1 is disposed on a surface or opposite surfaces of a polyolefin member, on a surface or opposite surfaces of a polyalkylene carbonate member, or between the polyolefin member and the polyalkylene carbonate member.

13. The adhesive structure according to claim 12, wherein the adhesive structure is a laminate sheet in which the polyolefin member, the adhesive member, and the polyalkylene carbonate member are sequentially stacked.

* * * * *